Dec. 14, 1948.  H. F. SHINDEL  2,456,334
PROTECTIVE GOGGLE
Filed July 29, 1947
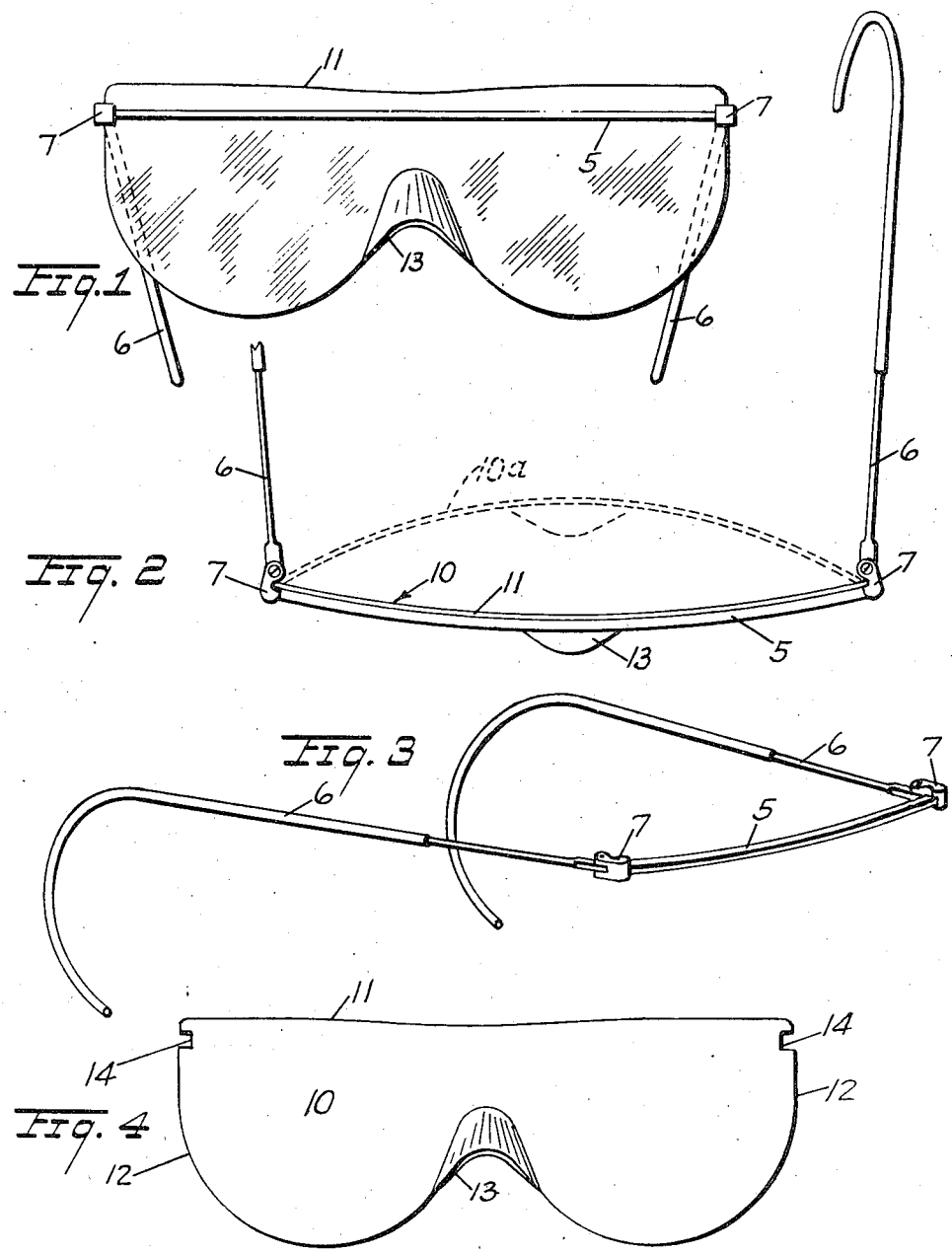
Harry F. Shindel
INVENTOR.

Patented Dec. 14, 1948

2,456,334

UNITED STATES PATENT OFFICE 2,456,334

PROTECTIVE GOGGLE

Harry F. Shindel, Reading, Pa., assignor to Willson Products, Inc., Reading, Pa., a corporation of Pennsylvania Application July 29, 1947, Serial No. 764,312

4 Claims. (Cl. 2—14)

My invention relates to protective goggles of the spectacle type, and my object is to provide a novel and economical device having a simple framing adapted to detachably mount a plastic sheet lens.

More specifically my improvements relate to a goggle of the aforesaid type having a mounting frame unit consisting of a transverse bar spacing a pair of temples pivotally connected to the ends thereof, a lens unit consisting of a flexible plastic sheet extending across both eyes, and to the means and manner of assembling said lens unit in readily detachable seated engagement with said mounting frame unit.

The nature of my improved framing and lens units and the manner of their detachable assembly into a component effective goggles structure will be more fully described hereinafter in connection with the accompanying drawings and the novel features thereof specifically set forth in the appended claims.

In the drawings:

Fig. 1 is a front view of a protective goggles showing the assembled engagement of mounting frame and lens units embodying my improvements.

Fig. 2 is a top view of the same, the curved dotted lines indicating the bowing of the lens unit for its assembly and disassembly engagement with the mounting frame unit.

Fig. 3 is a separate perspective view of the mounting frame unit, and

Fig. 4 is a separate front view of the flexible plastic sheet lens unit.

Referring to the drawing, and particularly Fig. 3, my mounting frame unit consists simply of a transverse bar or rod 5 of determined length, having temples 6, 6, pivotally connected to the ends thereof. The bar 5 may be made of any suitable material, but I have found metal preferable and I desirably form it of a flat bar outwardly bowed, or arched as shown, both to give sufficient rigidity to the spaced temples and to secure the flexible lens in seated engagement with said frame as will later herein be described.

The temples 6, 6, may be of any usual known form and material, and may be directly pivoted to properly shaped ends of bar 5, but I prefer to employ separate pivot ears 7, 7, commonly employed in spectacle construction, and to rigidly secure them to the ends of bar 5, in a rearwardly projecting relation to the latter, as shown in the drawings.

The lens 10, shown separately in Fig. 4, must necessarily be flexible so as to bend during engaging and disengaging connection with my above described mounting frame as will later herein appear. Plastic flexible sheet material of recognized suitability for such use as goggle lens is now commercially well-known, and I have shown such a sheet of material in Fig. 4, preferably shaped for my purposes with a substantially straight top edge 11, side edges 12, 12, with their upper portions substantially at right angles to said top edge 11, and their lower portions rounded and divided by a nasal recess 13 into separated eye protecting integral bottom extensions of said lens 10. This nasal recess 13 is shown as shaped to comfortably rest on the nose of a wearer, but its particular construction forms no part of my present invention, and it may be made in another manner, or may be of a separate construction secured to the plastic sheet. The upper side portions 12, 12 of this lens sheet are provided with notches 14, 14, adapted to be engaged with the temple pivoted connections at each end of the bar 5, as will now be described. These notches 14, 14, are preferably squared recesses extending inwardly from the top sides 12, 12, of the lens and of a spread to closely engage the vertical thickness of the pivot ears 7, 7, closely adjacent the connection of the latter to the bar 5.

The length of bar 5 is such as to space the temple 6, 6, the desired width for the particular goggles, and the plastic flexible sheet lens 10 is of slightly greater width than the spacings of said temples 6, 6, requiring a bowing or arching of the lens sheet to reduce its width so as to freely enter between said temples.

The dotted lines 10a in Fig. 2 indicate the aforesaid bowing of lens 10, and as thus curved it will be readily apparent that notches 14, 14 may be engaged with the pivot ears 7, 7, or other pivoted connections for the temple 6, 6. When the notches 14, 14, are thus engaged, the lens sheet 10 may be snapped back into flattened position.

To insure any unintentional disengagement of the notches 14, 14, and to give a desired forward bowing of the lens sheet to conform to the curvature of the face of a wearer, I form bar 5, as previously described, with a bowed or arched shape, as shown, and in snapping the lens 10 into seated engagement, I press the latter beyond its flat plane into a forward bowed rest against said bar 5. As thus seated the lens 10 will have the recognized desired bowing shape, its rest against bar 5 will support and give it desired rigidity, and notches 14, 14 will be securely retained in seated engagement with ears 7, 7, and will require a positive force to reversely flex said sheet in order to disengage them. The preferred squared engagement of the notches 14, 14 with the ears 7, 7, in connection with the bowed rest of the lens against bar 5, aids desired rigidity of the seated lens by preventing any rocking tendency on said notched engagement with the frame.

From the foregoing description it will be readily seen that my protective goggle consists of a novel mounting frame unit of simple essentials, and a flexible sheet lens unit, readily assembled into an effective and sturdy structure without the use of any tool or special skill. The bar 5 is not attached to the lens and forms only a supporting rest for the latter and a limit to its forward bowing, which forward bowing securely retains notches 14, 14 in seated engagement with pivot ears 6, 6. When assembled, the lens rests on the nose of a wearer, and is carried in position before the eyes of a wearer by the temples 6, 6, with the bar 5 extending across the face above the line of vision. The simple and quick manner of detaching the lens 10, permits of any required replacement, and ready changes to other lenses of suitable tints, varied light transmitting density, and other eye protective qualities.

The specific embodiment of my goggles above described may of course be changed and modified within the spirit of my invention as defined in the following claims.

What I claim:

1. A spectacle type of protective goggles comprising, a flexible lens extending across both eyes, and a detachable mounting frame therefor, said frame consisting of a transverse bar extending horizontally across the face above the line of vision and having ears extending from the ends thereof, temples pivotally connected to said ears, said lens having a flat width greater than the lateral spread between said ears, and a notch adjacent the top of each side edge of said lens adapted to be engaged with a corresponding ear by width-narrowing bowing of said lens and retained in seated engagement therewith by contact of a top portion of said lens with said transverse bar.

2. A spectacle type of protective goggles comprising, a flexible lens unit extending across both eyes, and a detachable mounting frame unit therefor, said frame unit consisting of a forwardly bowed bar extending transversely across the eyes above their line of vision in a substantially horizontal plane, and having ears extending substantially at right angles from the ends thereof, temples pivotally connected to said ears, said lens unit consisting of a flexible normally flat sheet extending across both eyes and of greater width than the lateral spread of said ears, with a substantial straight horizontal top edge, side edge portions substantially at right angles to said top edge and having laterally opening notches adjacent said top edge, and a midwidth recessed bottom edge provided with a nose rest, said lens being detachably assembled by bowing of said flexible lens to reduce its width for engagement of its lateral notches with said ears and securely retained in such engagement by reverse bowing of said lens to rest against said bowed transverse bar.

3. In the construction set forth in claim 2, said transverse bar having a substantially rectangular cross section extending flatwise between said ears, and said lateral lens notches forming squared recesses of a spread to snugly engage the vertical thickness of said pivotal temple connections adjacent the ends of said transverse bar.

4. A spectacle type of protective goggles comprising a mounting frame unit consisting of a bar extending transversely across the eyes of the wearer above the line of vision in a substantially horizontal plane, side edge portions integrally formed with and extending at right angles from the ends of said bar and having laterally inwardly extending notches, temples pivotally connected to said side edge portions, and a flexible lens having notches formed in the side edges thereof extending laterally outwardly in a direction towards the temples and whose distance apart is slightly greater than the spacing between the bottom of the grooves in said side edge portions, said lens being detachably secured to said mounting frame unit by bowing thereof away from said transverse bar to reduce its width for engagement of its lateral notches with the notches in said side portions, said lens being normally securely retained in such engagement by reverse bowing thereof which will cause it to rest against said transverse bar as a stop member.

HARRY F. SHINDEL.

REFERENCES CITED

The following references are of record in the file of this patent:

UNITED STATES PATENTS

| Number | Name | Date |
|---|---|---|
| 1,310,077 | Heaford | July 15, 1919 |
| 1,471,967 | Mahlmann | Oct. 23, 1923 |
| 1,879,216 | Hannan et al. | Sept. 27, 1932 |
| 2,179,286 | English | Nov. 7, 1939 |

FOREIGN PATENTS

| Number | Country | Date |
|---|---|---|
| 33,599 | Denmark | Sept. 1, 1924 |